United States Patent
Bockarev et al.

(10) Patent No.: US 10,224,703 B2
(45) Date of Patent: Mar. 5, 2019

(54) SUSPENSION ARRANGEMENT FOR ELECTRICAL OPERATING COMPONENTS

(71) Applicant: SIEMENS AKTIENGESELLSCHAFT, Munich (DE)

(72) Inventors: Alexander Bockarev, Berlin Marzahn-Hellersdorf (DE); Reinhard Goehler, Berlin (DE); Henrik Roggow, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/697,526

(22) Filed: Sep. 7, 2017

(65) Prior Publication Data
US 2018/0076608 A1 Mar. 15, 2018

(30) Foreign Application Priority Data
Sep. 14, 2016 (DE) .......... 10 2016 217 501

(51) Int. Cl.
| | |
|---|---|
| *H02G 7/05* | (2006.01) |
| *H01B 17/02* | (2006.01) |
| *H01T 19/02* | (2006.01) |
| *H02H 9/04* | (2006.01) |
| *B60M 1/23* | (2006.01) |

(52) U.S. Cl.
CPC ............ *H02G 7/05* (2013.01); *B60M 1/23* (2013.01); *H01B 17/02* (2013.01); *H01T 19/02* (2013.01); *H02H 9/045* (2013.01)

(58) Field of Classification Search
CPC ........... H02G 7/05; H01T 19/02; H02H 9/045

USPC ....................................................... 174/40 R
See application file for complete search history.

(56) References Cited

U.S. PATENT DOCUMENTS 4,658,100 A    4/1987  Suris
4,973,795 A *  11/1990 Sharpe ................ H02G 1/02
                                                  174/40 R
(Continued)

FOREIGN PATENT DOCUMENTS

CN    205429661 U    8/2016
DE      371760 C    3/1923
(Continued)

OTHER PUBLICATIONS

Siemens AG, "Leitungsableiter fuer erhoehte Systemzuverlaessigkeit" [Line Surge Arresters for Increased System Reliability], Siemens AG Energy Sector, 91058 Eriangen, 2012, pp. 1-16, E-50001-G630-A203—English version.
(Continued)

*Primary Examiner* — Dhiru R Patel
(74) *Attorney, Agent, or Firm* — Laurence Greenberg; Werner Stemer; Ralph Locher

(57) ABSTRACT

A hanging arrangement for items of electrical operating equipment includes an upper fastener for suspending the hanging arrangement, a plurality of items of operating equipment being arranged so as to hang in a parallel manner from the upper fastener, and a lower fastener which is arranged so as to hang from the items of operating equipment. The items of operating equipment are connected to the fasteners in each case by flexible contact device.

19 Claims, 4 Drawing Sheets

(56) References Cited

U.S. PATENT DOCUMENTS

| | | | |
|---|---|---|---|
| 5,581,051 A * | 12/1996 | Hill | H01H 31/00 174/138 R |
| 8,154,839 B2 | 4/2012 | Stenström et al. | |
| 2010/0103581 A1 | 4/2010 | Kruska et al. | |

FOREIGN PATENT DOCUMENTS

| | | |
|---|---|---|
| DE | 592548 C | 2/1934 |
| DE | 1076219 B | 2/1960 |
| DE | 8402726 U1 | 1/1985 |
| DE | 10324443 A1 | 12/2004 |
| DE | 102007010857 A1 | 9/2008 |
| EP | 0561315 A1 | 9/1993 |

OTHER PUBLICATIONS

Siemens AG, "Silikon-Langstabisolatoren 3FL fuer Mittel-und Hochspannungsfreileitungen" [3FL Silicone Long Rod Insulators for Distribution- and Transmission Overhead Power Lines] Siemens AG Energy Sector, 91058 Erlangen, 2011, pp. 1-8, E-50001-G630-A193—English version.

* cited by examiner

SUSPENSION ARRANGEMENT FOR ELECTRICAL OPERATING COMPONENTS

BACKGROUND OF THE INVENTION

Field of the Invention

The invention relates to a hanging arrangement for items of electrical operating equipment.

In power engineering, items of operating equipment are used which, in addition to electrical requirements, also have to meet mechanical requirements. Items of operating equipment can include, for example, insulators or surge arresters which are intended to be mounted in a hanging manner from an overhead power line or the like. Surge arresters for mounting in a hanging manner are known from the product brochure "Line Surge Arresters for Increased System Reliability", Siemens AG 2012, order no. E50001-G630-A203. Insulators in the form of long rod insulators are known from the product brochure "3FL Silicone Long Rod Insulators for Distribution and Transmission Overhead Power Lines", Siemens AG 2011, order no. E50001-G630-A193.

In this case, the mechanical requirements made of the items of operating equipment depend on a large number of factors, such as the manner of installation or the site of installation for example. In addition to the conventional installation of an item of operating equipment on the ground, mounting in a hanging manner also has various applications. Here, the challenge is that the item of operating equipment firstly has to carry its own weight and secondly has to absorb bending forces. The bending forces occur, in particular, as bending head forces at the suspension point when loads are produced tangentially to the main axis of the item of operating equipment. Forces of this kind can be produced, for example, by cables being pulled or by seismic activity or earthquakes. For technical or economic reasons, it is not always possible or expedient to dimension items of operating equipment to withstand the maximum possible forces. Nevertheless, customers require, in mechanical terms, that operation of their installations is ensured even in extreme situations.

Owing to particularly stringent electrical requirements, a plurality of items of operating equipment have to be connected in series under certain circumstances, this resulting in the items of operating equipment being hung in series in practice. However, as a result of this, the weight is relatively high and the lever arm is correspondingly long. This results in a high level of loading on the upper head connection for the hanging items of operating equipment which are connected in series. One possible solution is to mechanically strengthen the individual items of operating equipment, but this necessarily leads to increased production costs.

Another solution is to mount the items of operating equipment individually, for example on the hall ceiling. In this case, a base plate of an item of operating equipment can be connected to the head plate of the next item of operating equipment with the aid of a line. In this way, the lever arm is kept short and the individual weight to be supported is minimized. However, this type of mounting means a large space requirement in surface area.

A further approach is known from DE 10 2007 010 857 A1. In this case, a surge arrester is suspended from an overhead power line, a plurality of individual arrester modules being connected to one another by means of coupling arrangements in such a way that the surge arrester is of flexible design here.

Proceeding from known approaches for mounting items of operating equipment in a hanging manner, the object of the invention is to specify a hanging arrangement for items of electrical operating equipment which is comparatively space-saving and lightweight and also can withstand bending forces relatively well.

BRIEF SUMMARY OF THE INVENTION

The invention achieves this object by way of a hanging arrangement for items of electrical operating equipment as claimed.

Although large tensile forces can be absorbed in customary items of operating equipment, bending forces cannot be absorbed or can be absorbed only slightly. If, on account of the electrical requirements, a plurality of devices have to be connected in series or in parallel and then mounted in a hanging manner, this leads to a high overall weight. As a result, the mechanical stability required by the customer can no longer be ensured. The hanging arrangement according to the invention has the advantage that any bending forces which occur on the items of operating equipment are reduced to a minimum and the mechanical strength is ensured.

Owing to the parallel suspension of the items of operating equipment between upper and lower fastening means, the items of operating equipment cannot strike each other, and as a result be damaged, in the event of shocks or the like. The flexible contact means, which can be designed as flexible cables or litz wires for example, allow the hanging arrangement to also swing in the event of shocks and in this way prevent excessive bending stress on the items of operating equipment.

In a preferred embodiment of the hanging arrangement according to the invention, the items of operating equipment are arranged on the fastening means offset in relation to one another in a horizontal plane, so that the fastening means are stabilized in a horizontal hanging position. This has the advantage that swinging and rotational movements are further avoided. By way of example, the offset of the items of operating equipment can be designed in such a way that half of the items of operating equipment are arranged on a first horizontal axis and the other half of the items of operating equipment are arranged on a second horizontal axis which runs parallel to the first axis. If an alternating order is selected, that is to say the first item of operating equipment is associated with the first axis, the second item of operating equipment is associated with the second axis, the third item of operating equipment is again associated with the first axis and so on, this results in the items of operating equipment being suspended in a zigzag pattern in plan view. This is particularly advantageous because it can absorb bending loads well.

In a further preferred embodiment of the hanging arrangement according to the invention, the fastening means are designed substantially in the form of a plate. This is advantageous because a plate, for example composed of metal, is simple and cost-effective to manufacture and at the same time has a high mechanical load-bearing capacity.

In a further preferred embodiment of the hanging arrangement according to the invention, the fastening means are designed substantially as a profile with a wavy cross section. This is advantageous because a wavy profile of this kind is particularly stable while having a low weight. The lower the mass of the fastening means, the lower is the weight of the hanging arrangement overall and the greater is the number of "modules" comprising items of operating equipment and fastening means that can be hung in series, without exceeding the tensile load-bearing capacity of the items of operating equipment as prescribed by their design.

In a further preferred embodiment of the hanging arrangement according to the invention, further items of operating equipment are arranged on the lower fastening means, said further items of operating equipment being connected to an additional fastening means. The combination comprising a respective fastening means at the top and at the bottom and also the items of operating equipment can be understood to be a "module". In principle, as many modules as allowed by the tensile load-bearing capacity of the items of operating equipment as prescribed by their design can be hung one beneath the other. The advantage of this arrangement is that only a very small surface area on or above the ground is taken up. This allows the height of the hanging arrangement to be extended—namely by hanging it higher—without taking up additional space on the ground. The invention can therefore be advantageously used specifically in electrical installations with a very limited amount of available space and in retrofits.

In a further preferred embodiment of the hanging arrangement according to the invention, the items of operating equipment comprise electrical insulators.

In a further preferred embodiment of the hanging arrangement according to the invention, the insulators comprise long rod insulators.

In a further preferred embodiment of the hanging arrangement according to the invention, the items of operating equipment comprise surge arresters.

In a further preferred embodiment of the hanging arrangement according to the invention, at least one corona ring for electrical field control is associated with each fastening means. This is advantageous because corona rings are tried and tested for preventing field peaks at sharp edges of electrical installations under high voltage. In each case at least two corona rings are advantageously associated with each fastening means, one of said at least two corona rings being oriented upward and one of said at least two corona rings being oriented downward. In this case, the corona rings can be fitted, for example, to the fastening means or to the items of operating equipment.

In a further preferred embodiment of the hanging arrangement according to the invention, the flexible contact means are electrically conductive.

In a further preferred embodiment of the hanging arrangement according to the invention, the flexible contact means are designed as cables or litz wires. This is advantageous because this design is particularly simple, cost-effective and tried and tested.

In a further preferred embodiment of the hanging arrangement according to the invention, the flexible contact means have joints. This is advantageous because the joints can provide flexibility over a comparatively longer period of time whereas, in the case of simple litz wires or cables, wear phenomena may possibly occur owing to mechanical stress.

In a further preferred embodiment of the hanging arrangement according to the invention, the flexible contact means have ball-and-socket joints. This is advantageous because ball-and-socket joints provide a high degree of flexibility in all directions.

In a further preferred embodiment of the hanging arrangement according to the invention, the flexible contact means have hinge joints. This is advantageous because hinge joints are particularly reliable and low-maintenance. In this case, the hinge direction of all of the hinge joints has to be oriented in the same direction in order to allow the hanging arrangement to swing.

In a further preferred embodiment of the hanging arrangement according to the invention, the flexible contact means are of spring-action design. This is particularly advantageous because, owing to a spring arrangement, shocks or earthquakes can be withstood particularly well without damaging the hanging arrangement and the items of operating equipment. The spring arrangement used can be, for example, a helical spring. A combination with a damping element, as is used in automobile construction in shock absorbers for example, can also be advantageously used in order to operate the spring arrangement in the case of so-called creepage, without appreciable reverberation.

BRIEF DESCRIPTION OF THE SEVERAL VIEWS OF THE DRAWING

In order to better explain the invention.

DESCRIPTION OF THE INVENTION

Figure 1:
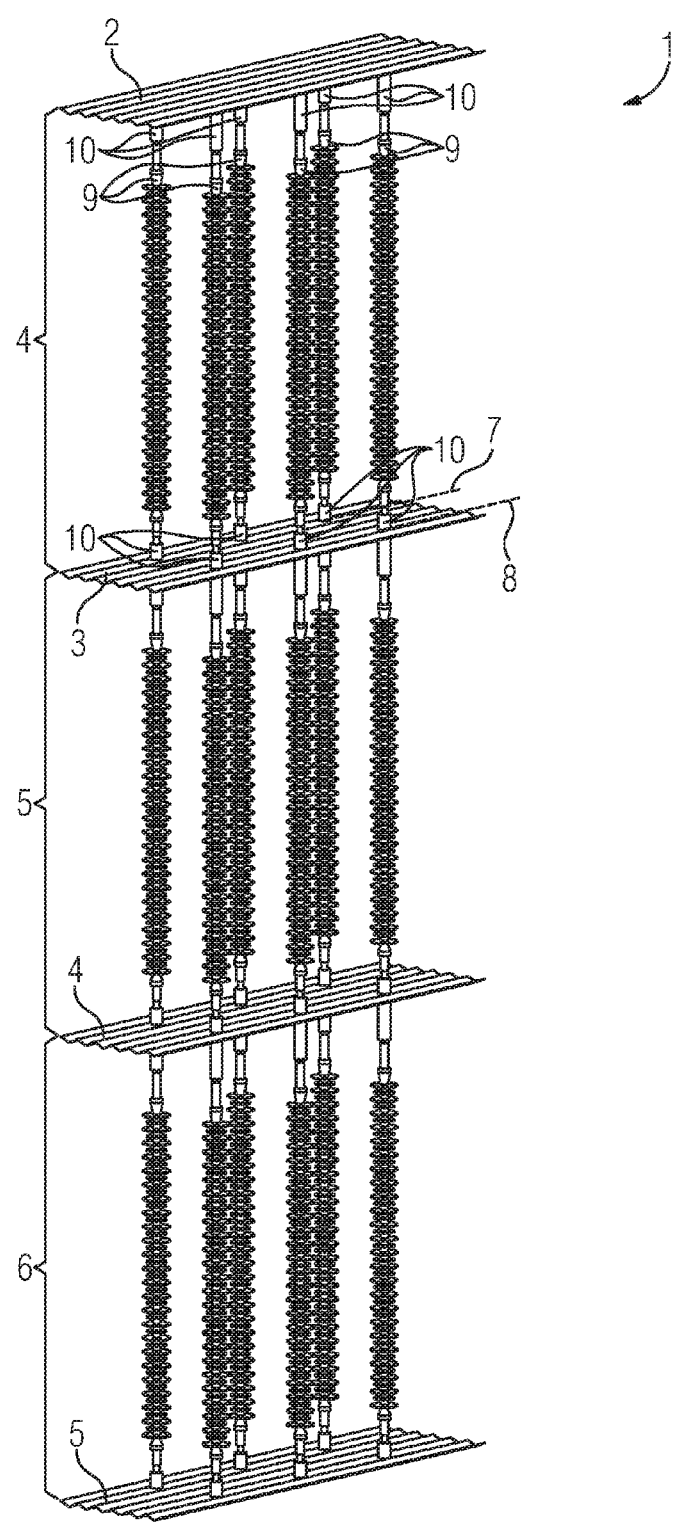
FIG. 1 shows a hanging arrangement with long rod insulators.

FIG. 1 shows a hanging arrangement according to the invention for items of electrical operating equipment. The items of electrical operating equipment are so-called long rod insulators 9 in the case shown. The items of operating equipment 9 are suspended from an upper fastening means 2. The upper fastening means 2 serves for suspending the entire hanging arrangement, for example from a hall ceiling or an appropriate suspension apparatus in the case of outdoor operation. The upper fastening means 2 is designed substantially in the form of a plate-like, flat metal element. However, this metal element is not solid, but rather has a wavy cross section of the profile, as indicated in the drawing. As a result, this component is comparatively lightweight while having a high degree of mechanical stability. The items of operating equipment 9 are connected to the upper fastening means 2 by means of flexible contact means 10. The flexible contact means 10 are short cylinders each having a ball-and-socket joint. The ball-and-socket joint provides a hollow space into which a spherical thickened portion at the end of the insulator is placed. A high degree of flexibility is achieved in this way. The flexible contact means 10 are formed from metal. They allow the long rod insulators used to be mechanically coupled to the upper fastening means 2. Flexible contact means 10 of identical design are again arranged at the lower end of the long rod insulators 9, said flexible contact means being arranged on a lower fastening means 3. The lower fastening means 3 is of substantially identical design to the upper fastening means 2, but with further flexible contact means 10 being fitted to the bottom side of the lower fastening means 3, so that further combinations comprising items of operating equipment 9 and lower fastening means 4, 5 can be suspended. In the illustrated figure, three modules 4, 5, 6 are formed in this way, said modules requiring a hanging arrangement of a large number of long rod insulators with a very small space requirement on the ground.

Owing to the flexible contact means 10, the hanging arrangement of the long rod insulators is able to swing along in the case of mechanical shocks or vibrations (for example in the event of earthquakes) and in this way to greatly reduce bending stresses on the long rod insulators.

The long rod insulators are arranged so as to hang in a parallel manner in the first module 4, and also in the further modules 5 and 6, wherein the items of operating equipment are arranged on the fastening means 2, 3 offset in relation to one another in a horizontal plane, so that the fastening means 2, 3 are stabilized in a horizontal hanging position—even in the case of severe shocks in conjunction with earthquakes. For explanatory purposes, two axes 7, 8 are marked on the lower fastening means 3, the flexible contact means 10 being lined up along said axes in an alternating sequence.

Figure 2:
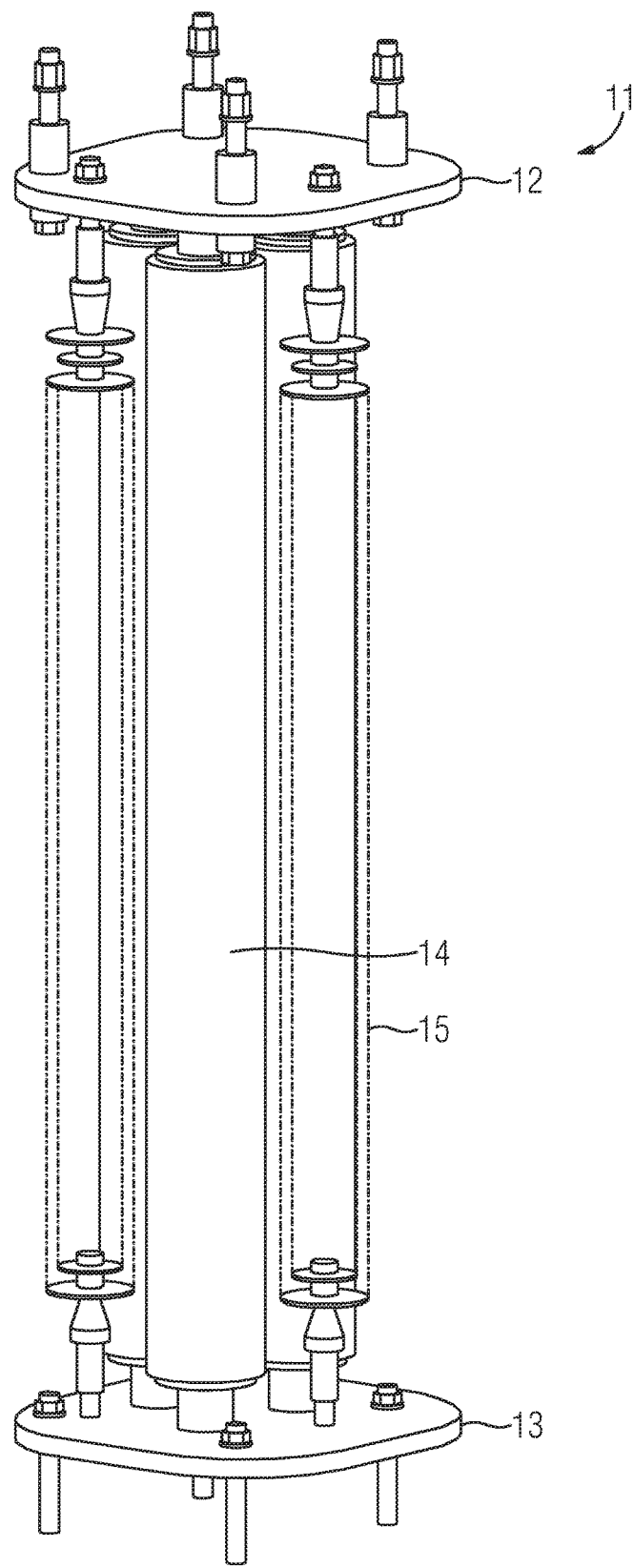
FIG. 2 shows an item of special operating equipment.

FIG. 2 shows a complex item of special operating equipment 11 which has an upper main plate 12 and a lower main plate 13. Three arrester columns 14 of a surge arrester and long rod insulators are arranged between the two main plates 12, 13, wherein the long rod insulators are merely indicated by dashed regions 15 in the illustration of FIG. 2. The long rod insulators brace resistor elements, which are placed loosely against one another, to form the arrester columns. This item of special operating equipment 11 has the semiconductor resistors in the arrester columns without a housing, so that heat which is produced can be dissipated to the outside very effectively. Said item of special operating equipment can be used in high-voltage direct-current (HVDC) transmission installations having a large number of inverter/rectifier modules and can be fitted there, for example, to a hall ceiling.

Figure 3:
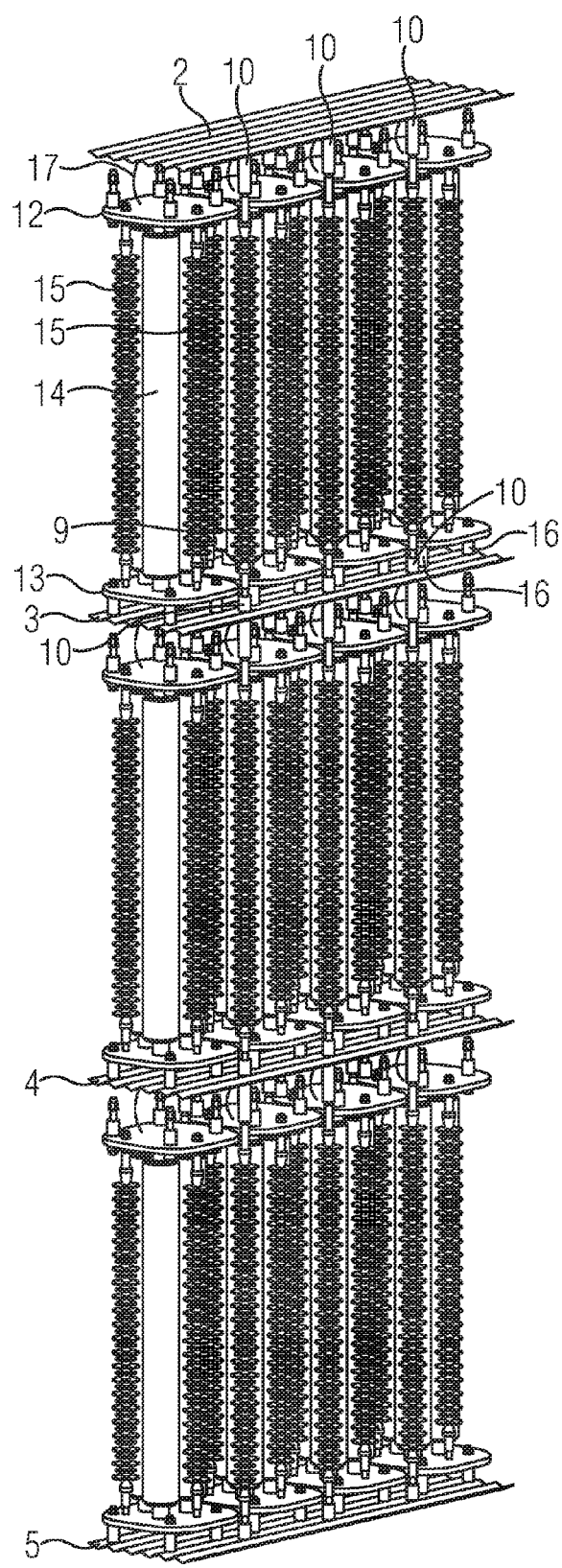
FIG. 3 shows a hanging arrangement with items of special operating equipment.

FIG. 3 shows a hanging arrangement according to the invention comprising the items of special operating equipment of FIG. 2. Identical components to those in FIG. 1 are identified by the same reference symbols. The items of special operating equipment are each rigidly fastened by way of their lower main plate 13 to the lower fastening means 3, 4, 5. In addition, further long rod insulators 9 are also arranged between the respectively lower and upper fastening means by means of flexible contact means 10. The connection between lower main plates 13 and lower fastening means 3, 4, 5 is established by rigid contact elements 16 in each case. In order to equip the hanging arrangement with a certain degree of flexibility, the items of special operating equipment, at their top side, are not rigidly connected to the respective upper fastening means by means of their respective upper main plate 12. However, the upper main plates 12 have an electrically conductive connection 17 to the fastening means hanging above them, said electrically conductive connection being formed by a litz wire 17 in the simplest case.

Rather, a mechanical connection is established between the fastening means by the long rod insulators which are connected by means of the flexible contact means 10. In this way, the items of operating equipment themselves can be fastened in a sufficiently flexible manner in the hanging arrangement, so that the entire hanging arrangement can withstand shocks or earthquakes without severe bending stress on the items of special operating equipment.

Figure 4:
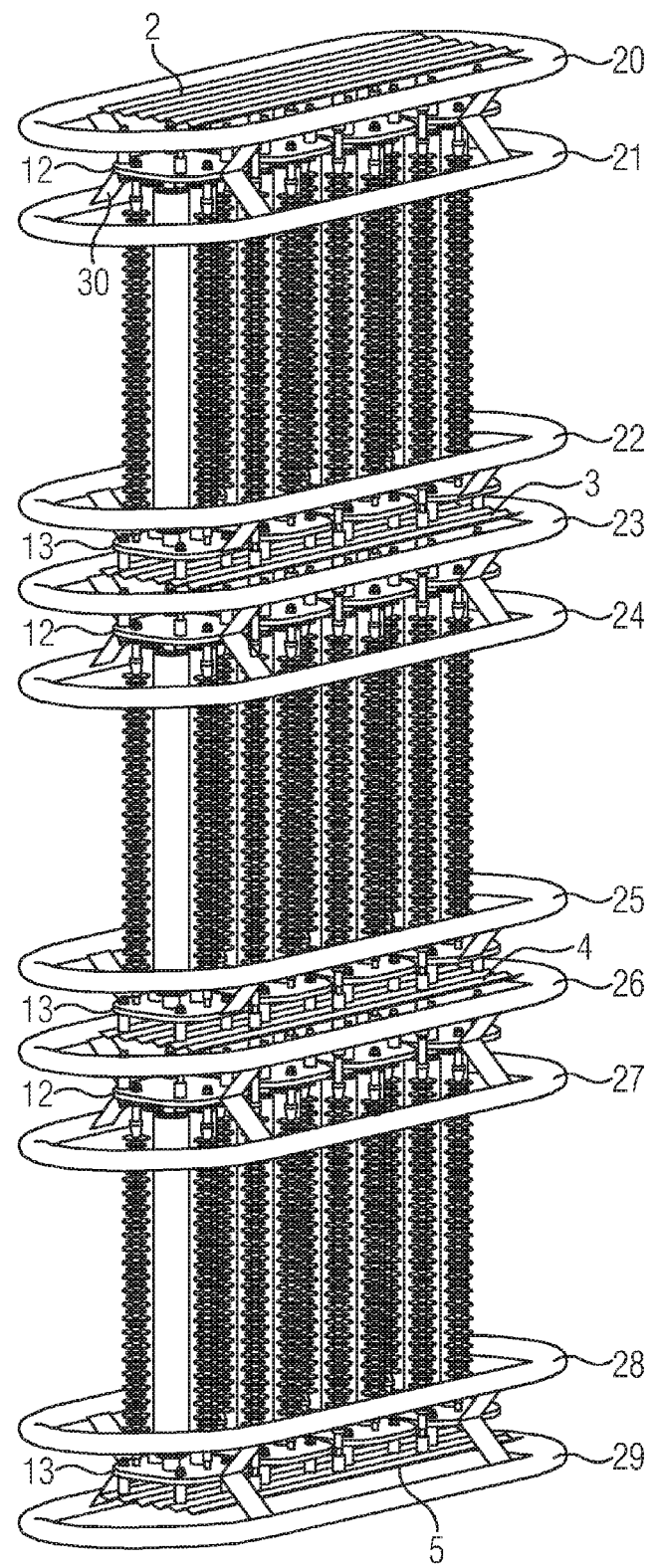
FIG. 4 shows the hanging arrangement according to FIG. 3 with additional corona rings.

FIG. 4 shows the hanging arrangement according to FIG. 3, wherein additional corona rings 20 to 29 for electrical field control are fitted. In each case four items of special operating equipment are hung next to one another in parallel, wherein corona rings are fitted to the two respectively outermost items of special operating equipment in the region of the upper fastening means 2. The corona rings are fitted to the upper main plate 12 of the items of special operating equipment, which are respectively on the outside in the row, by means of struts 30. In this case, one of the two corona rings 20 faces upward and the other 21 faces downward. In the same way, the corona rings 23, 24, 26, 27 and 28, 29 are also fitted to the main plates of the respectively outer items of special operating equipment. In addition, the two corona rings 22 and 25 are further arranged in the region of the lower fastening means 3 and 4 and are each fitted on the lower main plates of the items of special operating equipment and face upward. This provides electrical shielding at the two ends of the overall hanging arrangement by two corona rings 20, 21, 28, 29 in each case, whereas there are in each case three corona rings 22, 27 for field control in the regions in which two modules butt against one another.

The invention claimed is:

1. A hanging arrangement for electrical operating equipment, the hanging arrangement comprising:
   an upper fastener for suspending the hanging arrangement;
   a plurality of items of operating equipment hanging in parallel alignment from said upper fastener;
   a lower fastener disposed to hang from said items of operating equipment;
   flexible contact devices respectively connecting each of said items of operating equipment to said upper fastener and to said lower fastener;
   further items of operating equipment hanging in parallel alignment from said lower fastener;
   an additional fastener disposed to hang from said further items of operating equipment; and
   flexible contact devices respectively connecting each of said further items of operating equipment to said lower fastener and to said additional fastener.

2. The hanging arrangement according to claim 1, wherein said items of operating equipment are arranged on said fasteners offset in relation to one another in a horizontal plane, to thereby stabilize said fasteners in a horizontal hanging position.

3. The hanging arrangement according to claim 1, wherein said fasteners are substantially plate shaped.

4. The hanging arrangement according to claim 1, wherein said fasteners are substantially a profile with a wavy cross section.

5. The hanging arrangement according to claim 1, wherein said items of operating equipment are electrical insulators.

6. The hanging arrangement according to claim 5, wherein said insulators comprise elongated rod insulators.

7. The hanging arrangement according to claim 1, wherein said items of operating equipment are surge arresters.

8. The hanging arrangement according to claim 1, which comprises at least one corona ring for electrical field control associated with each said fastener.

9. The hanging arrangement according to claim 1, wherein said flexible contact devices are electrically conductive.

10. The hanging arrangement according to claim 1, wherein said flexible contact devices are cables or litz wires.

11. The hanging arrangement according to claim 1, wherein said flexible contact devices have joints.

12. The hanging arrangement according to claim 11, wherein said flexible contact devices have ball-and-socket joints.

13. The hanging arrangement according to claim 11, wherein said flexible contact devices have hinge joints.

14. The hanging arrangement according to claim 1, wherein said flexible contact devices are spring-action devices.

15. A hanging arrangement for electrical operating equipment, the hanging arrangement comprising:
   an upper fastener for suspending the hanging arrangement;
   a plurality of electrical devices selected from the group consisting of insulators and surge arresters suspended in parallel alignment from said upper fastener;
   an intermediate fastener disposed below said electrical devices;
   flexible contact devices flexibly connecting each of said electrical devices to said upper fastener and to said intermediate fastener;
   a plurality of further electrical devices selected from the group consisting of insulators and surge arresters suspended in parallel alignment from said intermediate fastener;
   a lower fastener disposed below said further electrical devices; and
   flexible contact devices respectively connecting each of said further electrical devices to said intermediate fastener and to said lower fastener.

16. The hanging arrangement according to claim 15, wherein said flexible contact devices are mechanical elements selected from the group consisting of cables, litz wires, ball-and-socket joints, hinge joints and spring-action devices.

17. The hanging arrangement according to claim 15, wherein said items of electrical devices are arranged on said fasteners offset in relation to one another in a horizontal plane, to thereby stabilize said fasteners in a horizontal hanging position.

18. The hanging arrangement according to claim 15, wherein said fasteners are substantially plate shaped.

19. The hanging arrangement according to claim 18, wherein said plate-shaped fasteners are substantially a profile with a wavy cross section.

* * * * *